(12) United States Patent
Zhu et al.

(10) Patent No.: US 10,924,594 B2
(45) Date of Patent: Feb. 16, 2021

(54) CAMERA ASSEMBLY AND MOBILE TERMINAL (71) Applicant: BEIJING XIAOMI MOBILE SOFTWARE CO., LTD., Beijing (CN)

(72) Inventors: Heming Zhu, Beijing (CN); Gaocai Han, Beijing (CN); Junjie Qin, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/686,146

(22) Filed: Nov. 16, 2019

(65) Prior Publication Data
US 2020/0412853 A1 Dec. 31, 2020

(30) Foreign Application Priority Data
Jun. 25, 2019 (CN) .......................... 201910556329.9

(51) Int. Cl.
*H04M 1/00* (2006.01)
*H04N 5/00* (2011.01)
(Continued)

(52) U.S. Cl.
CPC ....... *H04M 1/0264* (2013.01); *H04M 1/0254* (2013.01); *H04N 5/2254* (2013.01); *H04N 5/2257* (2013.01)

(58) Field of Classification Search
CPC ...... H04W 4/80; H04W 88/02; H04N 5/2252; H04N 5/2257; H04N 7/183; H04N 13/194; H04N 21/4223; H04N 2201/0055; H04M 1/0202; H04M 1/0254; H04M 1/0256; H04M 1/0264; H04M 1/7253; H04M 1/72527; H04M 2250/04; H04M 2250/52; H04B 1/3827; H04B 5/0025

See application file for complete search history.

(56) References Cited

U.S. PATENT DOCUMENTS 7,679,647 B2 * 3/2010 Stavely .............. H04N 5/23248
348/208.7
9,781,345 B1 * 10/2017 Miller .................. H04N 5/2253
(Continued)

FOREIGN PATENT DOCUMENTS

CN 205071146 U * 3/2016
CN 205071146 U   3/2016
(Continued)

OTHER PUBLICATIONS

Anonymous: "Moon by 1-Ring: World's Coolest Smart Home Hub I Indiegogo", Oct. 30, 2017(Oct. 30, 2017), XP055673931, Retrieved from the Internet: URL: https://www.indiegogo.com/projects/moon-by-1-ring-world-s-coolest-smart-home-hub#/ [ retrieved on Mar. 5, 2020] * the whole document *.
(Continued)

*Primary Examiner* — Quochien B Vuong
(74) *Attorney, Agent, or Firm* — Syncoda LLC; Feng Ma (57) ABSTRACT A camera assembly includes a camera component, a first wireless transmission component and a first magnet. The camera component is configured to acquire an image. The first wireless transmission component may be electrically connected to the camera component and configured to transmit data.

18 Claims, 9 Drawing Sheets (51) Int. Cl.
 H04M 1/02 (2006.01)
 H04N 5/225 (2006.01)

(56) References Cited

U.S. PATENT DOCUMENTS

| | | | |
|---|---|---|---|
| 10,021,280 B2 * | 7/2018 | Sharma | H04N 5/2254 |
| 10,116,776 B2 * | 10/2018 | Jannard | H04M 1/0264 |
| 10,187,313 B2 * | 1/2019 | Natarajan | H04M 1/72527 |
| 10,312,718 B2 | 6/2019 | Hahn et al. | |
| 10,419,648 B2 * | 9/2019 | Fuller | H04N 5/23203 |
| 10,429,666 B1 * | 10/2019 | Miller | G02B 7/08 |
| 2009/0143099 A1 | 6/2009 | Kang | |
| 2010/0225429 A1 | 9/2010 | Tsai | |
| 2013/0177304 A1 | 7/2013 | Chapman et al. | |
| 2014/0078389 A1 | 3/2014 | Merz | |
| 2017/0054883 A1 | 2/2017 | Sharma et al. | |
| 2017/0126268 A1 | 5/2017 | Evans, V et al. | |
| 2017/0201194 A1 | 7/2017 | Hahn et al. | |
| 2017/0272113 A1 | 9/2017 | Evans, V et al. | |
| 2018/0159580 A1 | 6/2018 | Evans, V et al. | |
| 2018/0267328 A1 * | 9/2018 | Fukushima | H04N 5/225 |
| 2019/0052780 A1 | 2/2019 | Sharma et al. | |

FOREIGN PATENT DOCUMENTS

| | | |
|---|---|---|
| CN | 106464166 A | 2/2017 |
| CN | 106603777 A | 4/2017 |
| CN | 106773451 A | 5/2017 |
| CN | 207099173 U | 3/2018 |
| CN | 109361968 A | 2/2019 |
| EP | 2607953 A1 | 6/2013 |
| JP | 2001014031 A | 1/2001 |
| KR | 20050089584 A | 9/2005 |
| KR | 20120036439 A | 4/2012 |
| KR | 20160105648 A | 9/2016 |
| KR | 101698866 B1 | 1/2017 |
| RU | 2251221 C2 | 4/2005 |
| RU | 157466 U1 | 12/2015 |
| RU | 2690196 C2 | 5/2019 |
| WO | 2016195144 A1 | 12/2016 |
| WO | 2017075479 A1 | 5/2017 |
| WO | 2018163037 A1 | 9/2018 |

OTHER PUBLICATIONS

International Search Report in the international application No. PCT/CN2019/111312, dated Mar. 13, 2020.
Written Opinion of the International Search Authority in the international application No. PCT/CN2019/111312, dated Mar. 13, 2020.
Supplementary European Search Report in the European application No. 19213187.8, dated Mar. 18, 2020.
Notice of Allowance of the Russian application No. 2019137308, dated May 26, 2020.

* cited by examiner

CAMERA ASSEMBLY AND MOBILE TERMINAL

CROSS-REFERENCE TO RELATED APPLICATION

This application claims priority to Chinese patent application No. 201910556329.9, filed on Jun. 25, 2019, the disclosure of which is hereby incorporated by reference in its entirety.

BACKGROUND

Mobile terminals such as mobile phones and tablet computers have become an indispensable part of users' daily lives. Cameras are an indispensable component in mobile terminals, and consumers are increasingly demanding better cameras, such as higher pixels and larger wide angles. The pixels, wide angles and the like of the cameras of the existing mobile terminals have been developed to a new high level. In addition to the pixels, the wide angles and other factors, the slight shake of the cameras during a photographing process may also affect the imaging quality.

SUMMARY

Embodiments of the present disclosure relate to the technical field of communications, and more particularly to a camera assembly and a mobile terminal.

An embodiment of the present disclosure provides a camera assembly, which includes a camera component, a first wireless transmission component and a first magnet. The camera component is configured to acquire an image. The first wireless transmission component is capable of being electrically connected to the camera component and configured to transmit data.

An embodiment of the present disclosure also provides a mobile terminal, which includes a main body and the foregoing camera assembly. The main body may include a housing, a second wireless transmission component and a magnetic suspension assembly. The second wireless transmission component is configured to establish a communication connection with the first wireless transmission component to transmit data between the main body and the camera assembly. The magnetic suspension assembly is configured to generate a magnetic force acting on the first magnet to maintain the camera assembly in a suspended state.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations described in the following exemplary embodiments do not represent all the implementations consistent with the embodiments of the present disclosure. Instead, they are merely examples of devices consistent with aspects of the embodiments of the present disclosure as detailed in the appended claims.

The terms used in the embodiments of the present disclosure are for the purpose of describing the specific embodiments only, and are not intended to limit the embodiments of the present disclosure. Unless otherwise defined, technical terms or scientific terms used in the embodiments of the present disclosure should be understood in the ordinary meaning of those of ordinary skill in the art to which the invention pertains. The words "first," "second" and similar terms used in the specification and claims of the present disclosure are not intended to indicate any order, quantity or importance, but only to distinguish different components. Similarly, the words "a" or "an" and the like do not denote a quantity limitation, but mean that there is at least one. "Multiple" or "several" means two or more than two. The similar words "including" or "comprising" and the like mean that elements or objects preceding "including" or "comprising" encompass elements or objects listed after "including" or "comprising" and their equivalents, and do not exclude other elements or objects. The similar words "connecting" or "connected" and the like are not limited to physical or mechanical connections, and may include electrical connections, whether direct or indirect. The singular forms "a," "the" and "this" used in the specification of the embodiments of the present disclosure and the appended claims are also intended to include a plurality of forms unless the context clearly indicates otherwise. It should also be understood that the term "and/or" as used herein refers to and encompasses any or all possible combinations of one or more of the associated listed items.

The anti-shake or stabilization mode of cameras is mainly optical stabilization, that is, by optical component setting, for example, lens setting, the phenomenon of instrument shake occurring during capturing of optical signals is avoided or reduced, thereby improving the imaging quality. However, since the optical anti-shake needs to be realized by moving optical lenses, the cost of an optical anti-shake system is very high, in addition, an optical structure is very precise, and thus the requirements on assembly are extremely high.

An embodiment of the present disclosure provides a camera assembly for a mobile terminal, such as a mobile phone, a tablet computer, or a smart wearable device. The camera assembly includes a camera component, a first wireless transmission component and a first magnet. The first wireless transmission component may be electrically connected to the camera component and configured to transmit data. In the embodiments of the present disclosure, since a camera assembly is provided with a first magnet, the camera assembly may be in a suspended state under a magnetic force applied to the first magnet; even if a main body of a mobile terminal slightly shakes or waggles, the first magnet may be still in an equally strong magnetic field. In this case, the magnetic force is not changed, so the camera assembly can remain stationary, thus ensuring good imaging quality. In addition, the camera assembly may be maintained in a suspended state to bring a new user experience. In the embodiment of the present disclosure, the "magnet" may include a permanent magnet and an electromagnet, and the "magnetic force" may include a magnetic force generated by the permanent magnet, and also may include an electromagnetic force generated by the electromagnet.

Figure 1:
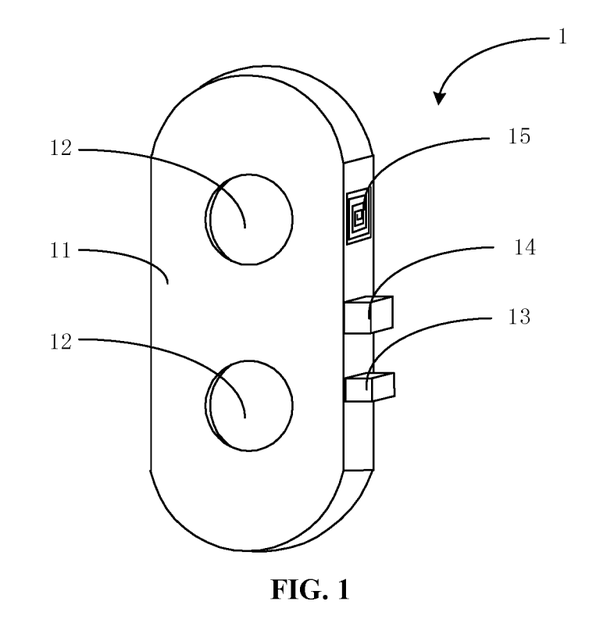
FIG. 1 is a three-dimensional view of one example of a camera assembly according to some embodiments of the present disclosure.
Figure 2:
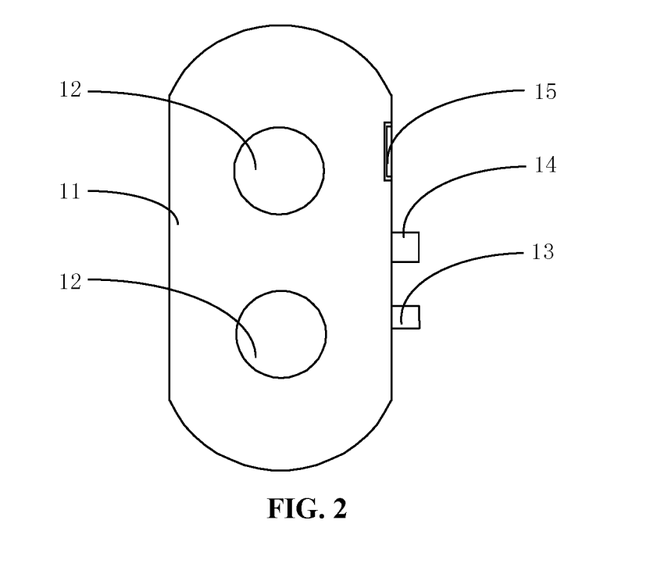
FIG. 2 is a front view of the camera assembly shown in FIG. 1.

Referring to FIG. 1 and FIG. 2, the camera assembly 1 of the present embodiment includes a camera component 11, a first wireless transmission component 13 connected to the camera component 11, a first magnet 14, and a wireless power receiving component 15. The "connection" here may be a direct connection, or may be an indirect connection through a connecting element, or may be embedding in a receiving space. The wireless power receiving component 15 may be electrically connected to the camera component 11 and the first wireless transmission component 13, respectively. The first magnet 14 may be located between the first wireless transmission component 13 and the wireless power receiving component 15. The wireless power receiving component 15 is configured to receive power and power the camera component 11 and the first wireless transmission component 13. The camera component 11 is configured to acquire an image. The first wireless transmission component 13 is configured to be paired with a mobile terminal and perform data transmission, transmit the captured image to the mobile terminal, and receive various control signals from the mobile terminal.

The camera component 11 may include a lens 12, an optical lens, an imaging element, a circuit board, a motor, and other structures. The first wireless transmission component 13 may be electrically connected to the circuit board of the camera component 11. In the present embodiment, the number of the lenses 12 is two, and the two lenses 12 may be respectively a zoom lens and a telephoto lens. In other embodiments, the number of the camera components 11 may be one or two or more.

The first wireless transmission component 13 may be, for example, a short-range millimeter wave wireless transmission component, a Near Field Communication (NFC) component, a Bluetooth component, a ZigBee component, a Wi-Fi component, etc., and may perform wireless data transmission. In other embodiments, the first wireless transmission component 13 may also be powered without the wireless power receiving component 15. For example, the first wireless transmission component 13 may be an NFC component, and power may be supplied by an induced voltage of a radio frequency signal.

The first wireless transmission component 13 may be, for example, a coil, and may receive power of the mobile terminal, that is, using an electromagnetic field to transmit power, which is similar to a transformer in principle. In other embodiments, the wireless power receiving component 15 may be replaced with a battery to directly provide power for the camera component 11 and the first wireless transmission component 13.

It can be understood that in order to avoid mutual influence of electromagnetic fields between the first magnet 14 and the first wireless transmission component 13, a metal shielding element may be disposed therebetween.

Since the data transmission and the power supply of the camera assembly 1 are independent of other components, the camera assembly 1 may be maintained in a suspended state under a magnetic force of an equally strong magnetic field received by the first magnet 14. Even if the main body of the mobile terminal slightly shakes or waggles during the photographing, the first magnet 14 may be maintained in the equally strong magnetic field. In this case, the magnetic force received by the first magnet 14 does not change, and the camera assembly 1 can remain stationary, thereby ensuring the imaging quality of the camera component 11.

Figure 3:
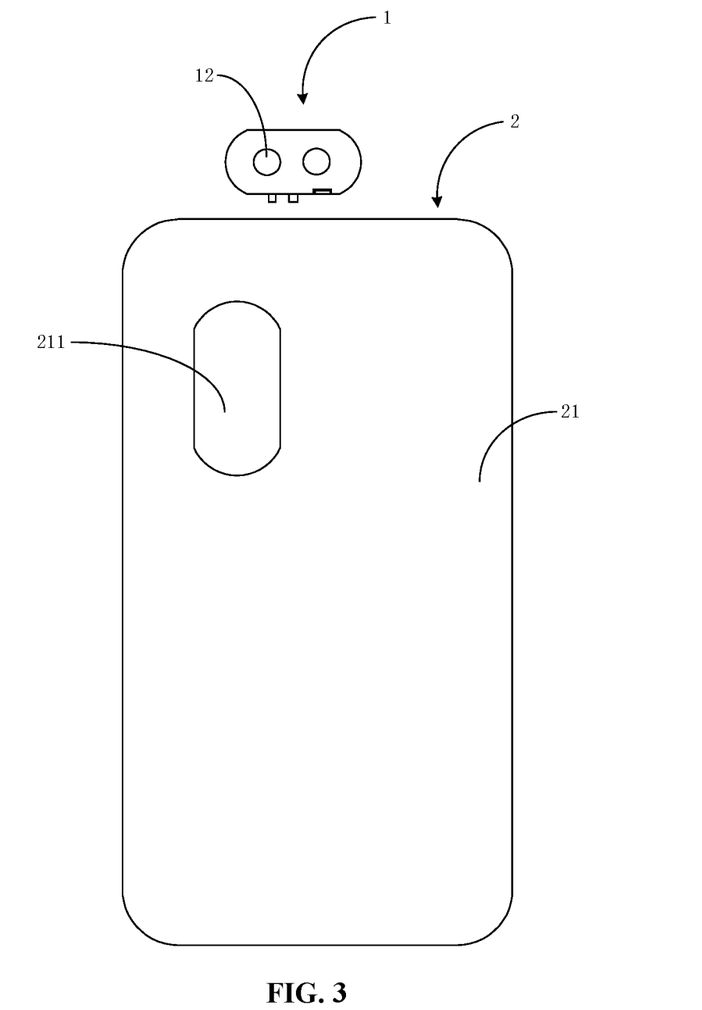
FIG. 3 is a rear view of one example of a mobile terminal according to some embodiments of the present disclosure.
Figure 4:
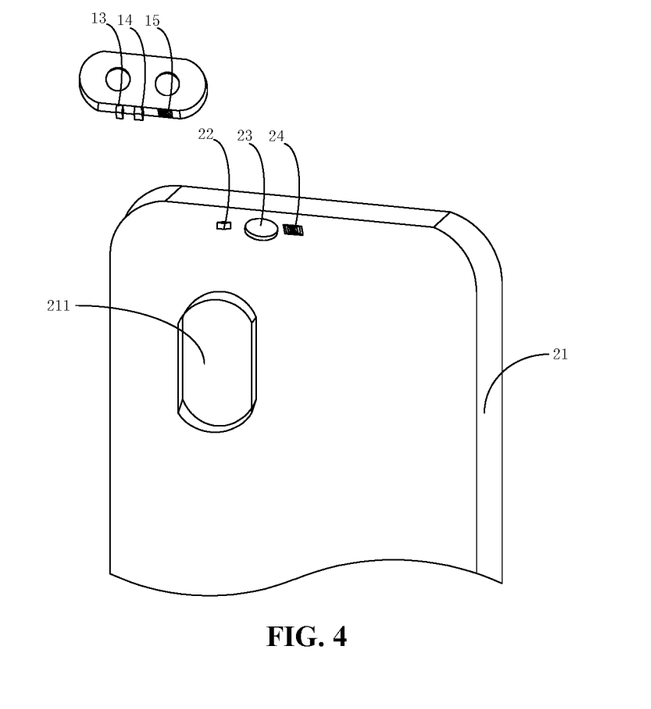
FIG. 4 is a three-dimensional view of the mobile terminal shown in FIG. 3, where in order to facilitate observation, a housing is subjected to perspective processing, and a camera assembly is also rotated.

In addition, an embodiment of the present disclosure also provides a mobile terminal, which includes a main body and the camera assembly according to any of the foregoing embodiments. Referring to FIG. 3 and FIG. 4, in the present embodiment, the mobile terminal may be, for example, a mobile phone, which may include a main body 2 and a camera assembly 1. The main body 2 may include a housing 21, a second wireless transmission component 22 mounted in the housing 21, a magnetic suspension assembly 23 and a wireless power transmitting component 24. The magnetic suspension assembly 23 may be located between the second wireless transmission component 22 and the wireless power transmitting component 24. The second wireless transmission component 22 is configured to establish a communication connection with the first wireless transmission component 13 to transmit data between the main body 2 and the camera assembly 1. The magnetic suspension assembly 23 is configured to generate a magnetic force acting on the first magnet 14 to maintain the camera assembly 1 in a suspended state. The wireless power transmitting component 24 is configured to transmit power to the wireless power receiving component 15.

Of course, the mobile terminal further may include a display screen 25, a processing component 26, a power management component 29, a storage component, a battery, and other elements. The housing 21 is a housing of the mobile terminal. A transmission protocol of the second wireless transmission component 22 may be consistent with a transmission protocol of the first wireless transmission component 13, such as a short-range data transmission component, a Near Field Communication (NFC) component, a Bluetooth component, a ZigBee component, and a Wireless Fidelity (Wi-Fi) component. The wireless power transmitting component 24 may be a coil.

The magnetic suspension assembly 23 may include at least one electromagnetic coil. The at least one electromagnetic coil may be energized to generate a magnetic force for the magnet, and is configured to provide an equally strong magnetic field in a predetermined region. In the predetermined region, the magnetic field strength and the magnetic field direction may be the same or approximately the same. The magnetic force of the equally strong magnetic field acting on the first magnet 14 can maintain the camera assembly 1 in a suspended state.

Figure 5:
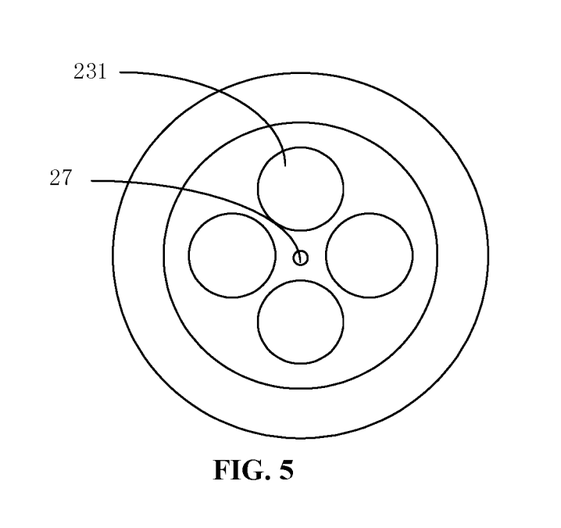
FIG. 5 is a front view of a magnetic suspension assembly of the mobile terminal shown in FIG. 3.

Referring to FIG. 5, the magnetic suspension assembly 23 may include a plurality of electromagnetic coils 231, arranged in a circumferential direction. In the present embodiment, the number of the electromagnetic coils 231 is four, and when the camera assembly 1 is in a suspended state, the first magnet 14 may be aligned with the center of the magnetic suspension assembly 23. The electromagnetic coil 231 may generate a magnetic force after being energized, in which case the magnetic force may be a repulsive force. The horizontal component force of the magnetic force may cause the camera assembly 1 to remain stationary in a horizontal direction by zero force, and the vertical component of the magnetic force may be used to counteract the gravity, and may cause the camera assembly 1 to remain stationary in a vertical direction by zero force. In other embodiments, the magnetic suspension assembly 23 may be composed of a plurality of permanent magnets or may be composed of a permanent magnet and an electromagnet, and also may enable the camera assembly 1 to remain stationary by zero force.

When a user takes a picture using the mobile terminal, the main body 2 of the mobile terminal may be slightly shaken, but the displacement of the magnetic suspension assembly 23 caused by the slight shake of the main body 2 may be almost negligible, and the basic equally strong magnetic field hardly changes, that is, the first magnet 14 is still in the equally strong magnetic field, the magnetic force received by the first magnet 14 does not change, and the magnetic force provided by the magnetic suspension assembly 23 still can make the camera assembly 1 maintained in a suspended state and remain stationary.

Figure 6:
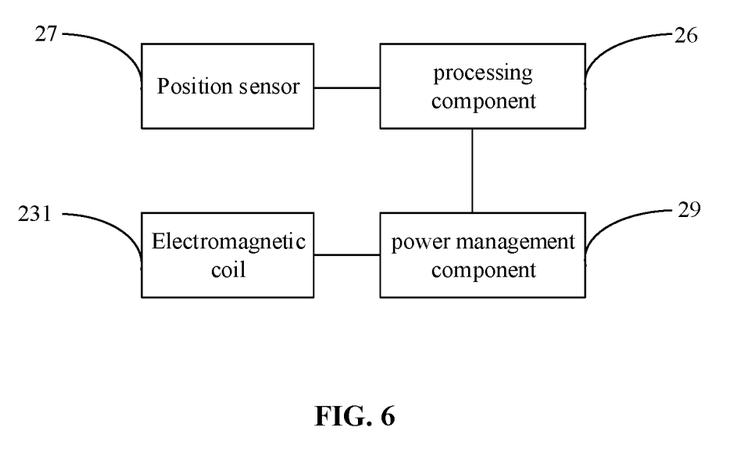
FIG. 6 is a view of a circuit of controlling an electric current of an electromagnetic coil according to some embodiments of the present disclosure.

Referring to FIG. 5 and FIG. 6, preferably, the main body 2 further may include a position sensor 27 electrically connected to the processing component 26. The battery may supply power to each electromagnetic coil 231 through the power management component 29. The position sensor 27 is configured to acquire a position of the camera assembly 1 relative to the main body 2, and the processing component 26 may adjust an electric current of each electromagnetic coil 231 through the power management component 29 according to the position of the camera body 1 relative to the main body 2, thereby adjusting the magnetic force received by the first magnet 14 and causing the camera assembly 1 to remain stationary by zero resultant force. Even if the main body 2 has a large amplitude of shaking or waggling, the first magnet 14 may be disengaged from the above-mentioned equally strong magnetic field, and the adjusted magnetic force may enable the camera assembly 1 to remain stationary.

In the present embodiment, the position sensor 27 may include at least one of a gyroscope, a gravity sensor, or an acceleration sensor. Existing mobile terminals are usually equipped with sensors such as gyroscopes, gravity sensors or acceleration sensors, so that component cost and assembly cost may be not increased.

Figure 8:
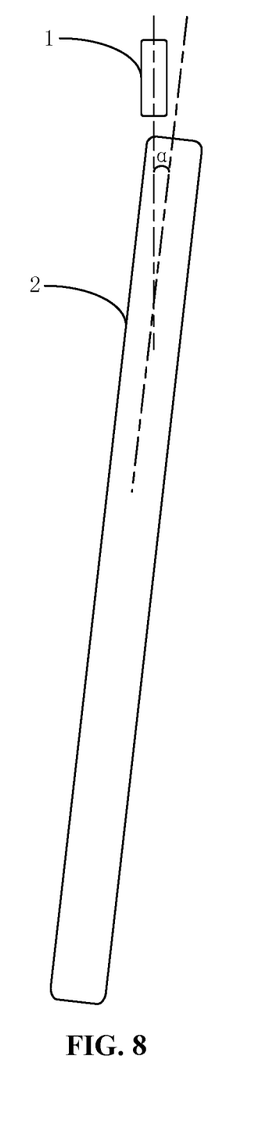
FIG. 8 is a side view of the mobile terminal shown in FIG. 3, where a main body is inclined relative to a camera assembly.

Referring to FIG. 8, when the camera assembly 1 is in a suspended state, the position sensor 27, such as a gyroscope, may detect an angle α between the main body 2 and the camera assembly 1, and the angle α is an angle between a center line (or approximately a center line) of the main body 2 and a center line (or approximately a center line) of the camera assembly 1. The center line may be a vertical center line or a horizontal center line. When the angle α is greater than a preset threshold, the processing component 26 may control the electric current of the at least one electromagnetic coil 231 through the power management component 29, and change parameters such as the magnitude and/or direction of the magnetic force acting on the first magnet 14 by the electromagnetic coil 231. The preset threshold may be experimentally determined, that is, when the angle α is not greater than the preset threshold, the camera assembly 1 may be stably suspended above the main body 2.

For example, when an upper end of the main body 2 is inclined toward the user, the angle α between the main body 2 and the camera assembly 1 is greater than a preset threshold, the distance between the electromagnetic coil 231 near the user side and the first magnet 14 may be reduced, the magnetic force generated by the first magnet 14 may be increased accordingly, and the processing component 26 may lower the electric current of the electromagnetic coil 231 near the user side or the electric current of the electromagnetic coil 231 away from the user side by the power management component 29, thereby changing the magnetic force of the electromagnetic coil 231 acting on the first magnet 14, so that the camera assembly 1 may remain stationary by zero force, that is, still in a suspended state.

In some embodiments, when the camera assembly 1 is in a suspended state, the position sensor 27 may detect an angle α between the main body 2 and the camera assembly 1, and when the angle α is greater than a preset threshold, the processing component 26 may change a direction of the electric current of the electromagnetic coil 231 through the power management component 29, so that the electromagnetic coil 231 may apply an attractive force to the first magnet 14, and the camera assembly 1 may rotate for α and may be attached to the upper end of the main body 2 accordingly, thereby avoiding the camera assembly 1 from being damaged by falling. It should be noted that the user may actively adjust the angle of the main body 2 based on a shooting angle, and the camera assembly 1 may rotate to an angle consistent with the main body 2 to satisfy the user's requirement for the change of the shooting angle.

In the present embodiment, the magnetic suspension assembly 23 may be disposed on either side of the housing 21 and configured to generate a magnetic force acting on the first magnet 14 to make the camera assembly 1 suspended above the housing 21. In other embodiments, the magnetic suspension assembly 23 may be disposed on either side of the housing 21, for example, on either side wall or either inner side wall, and the side wall may include upper, lower, left and right walls of the housing 21. The camera assembly 1 may be suspended above the main body 2 regardless of how the user holds the main body 2.

Figure 7:
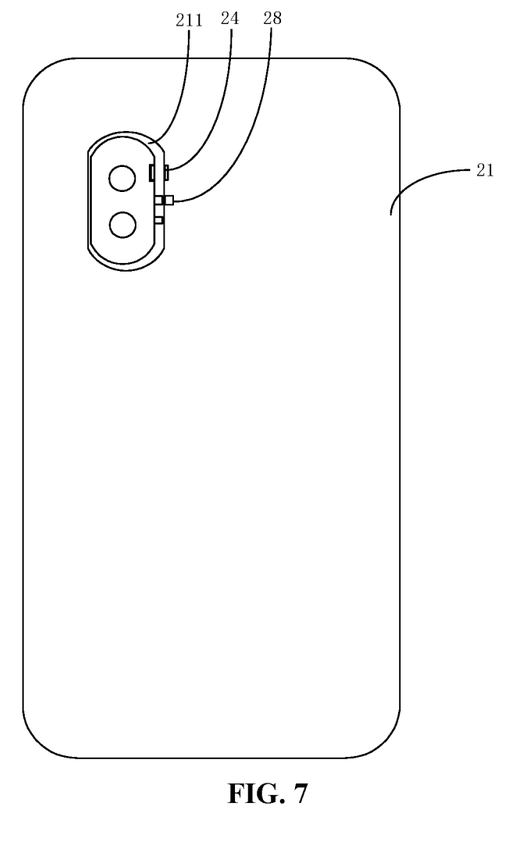
FIG. 7 is a rear view of the mobile terminal shown in FIG. 3, where a camera assembly is located in a receiving portion.

Referring to FIG. 3, FIG. 4 and FIG. 7, the housing 21 may include a receiving portion 211 for receiving the camera assembly 1. The main body 2 further may include a second magnet 28 mounted in the housing 21. The second magnet 28 may be disposed in or adjacent to the receiving portion 211. The second magnet 28 is configured to generate a magnetic force for the first magnet 14 to hold the camera assembly 1 in the receiving portion 211, that is, the camera assembly 1 may be detachably connected with the main body 2 of the mobile terminal and may be fixed by magnetic attraction when being received in the receiving portion 211. The camera assembly 1 may be received in the receiving portion 211 when not in use. When being received in the receiving portion 211, the camera assembly 1 may be taken for photographing or camera shooting. Since the distance between the first wireless transmission component 13 and the second wireless transmission component 22 is small, data may be transmitted therebetween. Another wireless power transmitting component 24 may be disposed in the receiving portion 211 and configured to transmit power to the wireless power receiving component 15 to supply power for the camera component 11.

It is to be noted that when the camera assembly 1 is in a suspended state, the two lenses 12 may be arranged in a horizontal direction; and when the camera assembly 1 is located in the housing portion 211, the two lenses 12 may be arranged in a vertical direction. A user may determine how to arrange the lenses 12 according to requirements, that is, arrange horizontally or vertically, and the user's requirement of horizontal or vertical shooting may be satisfied without rotating the main body 2.

Figure 9:
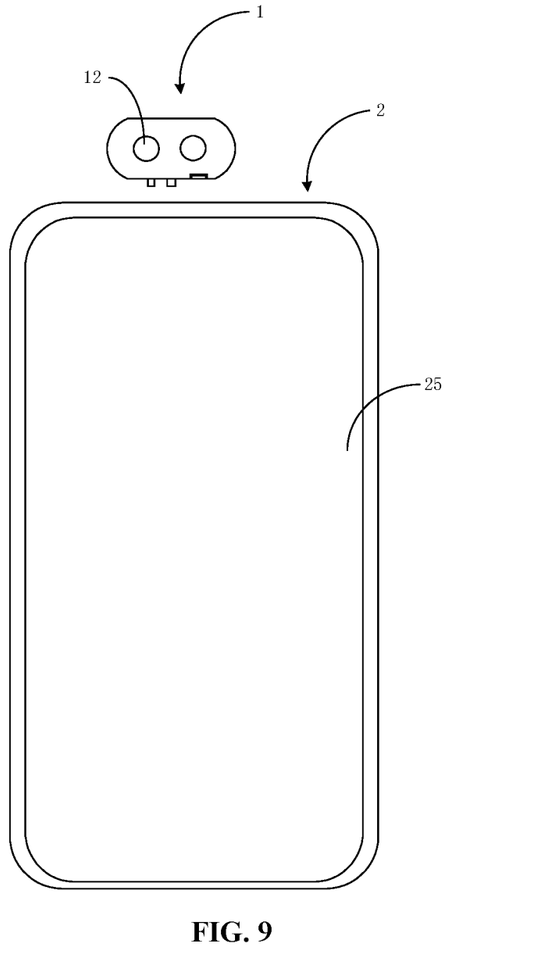
FIG. 9 is a front view of the mobile terminal shown in FIG. 3, where a lens faces forward.

Referring to FIG. 3 and FIG. 9, the lens 12 of the camera component 11 shown in FIG. 3 faces the rear of the main body 2. A user may rotate the camera assembly 1 for 180 degrees relative to its vertical center line, with the lens 12 of the camera component 11 facing the front of the main body 2, i.e., facing the user, thereby allowing self-portraits or video chats. In other words, the mobile terminal according to the embodiment of the present disclosure does not need to separately provide a front camera, thereby reducing the component cost and assembly cost of the front camera, and since the front camera is not needed additionally, it is beneficial to increase the screen ratio of the mobile terminal and obtain better user experience. In addition, the specifications of the camera component 11 are comparable to those of a rear camera of the existing mobile terminal, so the imaging quality can be significantly better than that of the existing front camera.

In the embodiments of the present disclosure, since a camera assembly is provided with a first magnet, the camera assembly can be maintained in a suspended state under a magnetic force applied to the first magnet; even if a main body of a mobile terminal slightly shakes or waggles, the first magnet can be still in an equally strong magnetic field. In this case, the magnetic force is not changed, so the camera assembly can remain stationary, thus ensuring good imaging quality. In addition, the camera assembly can be maintained in a suspended state to bring a new user experience.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A camera assembly, comprising:
a camera component;
a first wireless transmission component; and
a first magnet;
wherein the camera component is configured to acquire an image, and the first wireless transmission component is capable of being electrically connected to the camera component and is configured to transmit data; and
the camera component comprises at least two lenses;
when the camera assembly is located in a receiving portion of a mobile terminal with the camera assembly, the two lenses are arranged in a vertical direction, and
when the camera assembly is in a suspended state, the two lenses are arranged in a horizontal direction.

2. The camera assembly of claim 1, further comprising a wireless power receiving component or a battery for supplying power to the camera component.

3. A mobile terminal, comprising a main body and a camera assembly; wherein
the camera assembly comprises:
a camera component, configured to acquire an image;
a first wireless transmission component, capable of being electrically connected to the camera component and configured to transmit data; and
a first magnet;
the main body comprises:
a housing;
a second wireless transmission component, configured to establish a communication connection with the first wireless transmission component to transmit data between the main body and the camera assembly; and
a magnetic suspension assembly, configured to generate a magnetic force acting on the first magnet to maintain the camera assembly in a suspended state; wherein the camera component comprises at least two lenses; when the camera assembly is located in a receiving portion of the housing, the two lenses are arranged in a vertical direction, and when the camera assembly is in a suspended state, the two lenses are arranged in a horizontal direction.

4. The mobile terminal of claim 3, wherein the housing comprises a receiving portion, the mobile terminal comprises a second magnet mounted in the housing, and the second magnet is configured to generate a magnetic force for the first magnet to maintain the camera assembly in the receiving portion.

5. The mobile terminal of claim 4, wherein the camera component comprises a wireless power receiving component, the main body comprises a wireless power transmitting component, and the wireless power receiving component is configured to receive power transmitted by the wireless power transmitting component and supply power to the camera component.

6. The mobile terminal of claim 4, wherein the magnetic suspension assembly is disposed on either side of the main body and configured to generate a magnetic force acting on the first magnet to make the camera assembly suspended above the housing.

7. The mobile terminal of claim 3, wherein the camera component comprises a wireless power receiving component, the main body comprises a wireless power transmitting component, and the wireless power receiving component is configured to receive power transmitted by the wireless power transmitting component and supply power to the camera component.

8. The mobile terminal of claim 3, wherein the magnetic suspension assembly is disposed on either side of the main body and configured to generate a magnetic force acting on the first magnet to make the camera assembly suspended above the housing.

9. The mobile terminal of claim 3, wherein the magnetic suspension assembly comprises at least one electromagnetic coil, wherein the at least one electromagnetic coil, upon energized, is capable of generating a magnetic force for the first magnet to maintain the camera assembly in a suspended state.

10. The mobile terminal of claim 9, wherein the magnetic suspension assembly comprises a plurality of electromagnetic coils, arranged in a circumferential direction.

11. The mobile terminal of claim 9, wherein the main body comprises a processing component, a power management component and a position sensor, wherein the processing component is capable of being electrically connected to the position sensor and the power management component, respectively, the position sensor is configured to acquire a position of the camera assembly relative to the main body, and the processing component is further configured to control an electric current of the at least one electromagnetic coil through the power management component according to the position of the camera assembly relative to the main body.

12. The mobile terminal of claim 11, wherein the position sensor comprises at least one of a gyroscope, a gravity sensor and an acceleration sensor.

13. The mobile terminal of claim 12, wherein when the camera assembly is in a suspended state, the position sensor is configured to detect an angle between the main body and the camera assembly, and when the angle is greater than a preset threshold, the processing component is configured to change a direction of the electric current of the at least one electromagnetic coil through the power management component to enable the at least one electromagnetic coil to apply an attractive force to the first magnet.

14. The mobile terminal of claim 11, wherein when the camera assembly is in a suspended state, the position sensor is configured to detect an angle between the main body and the camera assembly, and when the angle is greater than a preset threshold, the processing component is configured to change a direction of the electric current of the at least one electromagnetic coil through the power management component to enable the at least one electromagnetic coil to apply an attractive force to the first magnet.

15. A mobile phone comprising a camera assembly including:

a camera component;

a first wireless transmission component; and a first magnet;

wherein the camera component is configured to acquire an image, and the first wireless transmission component is capable of being electrically connected to the camera component and is configured to transmit data, the mobile phone further comprising a display screen, wherein the camera assembly is configured to be in a suspended state under a magnetic force of the first magnet; wherein the camera component comprises at least two lenses; when the camera assembly is located in a receiving portion of the mobile phone, the two lenses are arranged in a vertical direction, and when the camera assembly is in a suspended state, the two lenses are arranged in a horizontal direction.

16. The mobile phone of claim 15, wherein the camera assembly is configured to remain stationary under a movement of a main body of the mobile phone.

17. The mobile phone of claim 16, wherein the camera assembly is configured to remain stationary as a result of the magnetic force not changed in response to the movement of the main body.

18. The mobile phone of claim 17, wherein the first magnet comprises at least one of a permanent magnet or an electromagnet.

* * * * *